(12) United States Patent
Kimura et al.

(10) Patent No.: US 11,883,720 B2
(45) Date of Patent: Jan. 30, 2024

(54) GOLF BALL

(71) Applicant: Bridgestone Sports Co., Ltd., Tokyo (JP)

(72) Inventors: Akira Kimura, Saitamaken (JP); Hirotaka Shinohara, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 17/123,352

(22) Filed: Dec. 16, 2020

(65) Prior Publication Data

US 2021/0187361 A1   Jun. 24, 2021

(30) Foreign Application Priority Data

Dec. 23, 2019   (JP) .................................. 2019-231164

(51) Int. Cl.
*A63B 37/06*   (2006.01)
*A63B 37/00*   (2006.01)
*C09D 175/06*   (2006.01)
*C08K 5/541*   (2006.01)

(52) U.S. Cl.
CPC ...... *A63B 37/0096* (2013.01); *A63B 37/0074* (2013.01); *A63B 37/00221* (2020.08); *C09D 175/06* (2013.01); *C08K 5/541* (2013.01)

(58) Field of Classification Search
CPC .................. A63B 37/0022; A63B 37/0096
USPC ....................................................... 473/378
See application file for complete search history.

(56) References Cited

U.S. PATENT DOCUMENTS

| | | |
|---|---|---|
| 2002/0119832 A1 | 8/2002 | Higuchi et al. |
| 2002/0119839 A1 | 8/2002 | Higuchi et al. |
| 2016/0136484 A1* | 5/2016 | Inoue .................. C08G 83/007 473/378 |
| 2017/0002264 A1* | 1/2017 | Kawataki ............... C09K 11/08 |
| 2019/0001192 A1 | 1/2019 | Shinohara et al. |
| 2019/0001193 A1 | 1/2019 | Shinohara et al. |
| 2020/0306592 A1* | 10/2020 | Horiuchi ................ C08G 18/73 |

FOREIGN PATENT DOCUMENTS

| | | |
|---|---|---|
| JP | 2002-186686 A | 7/2002 |
| JP | 2002-186687 A | 7/2002 |
| JP | 2007-296383 A | 11/2007 |
| JP | 2010-179119 A | 8/2010 |
| JP | 2011-72836 A | 4/2011 |
| JP | 2019-10190 A | 1/2019 |
| JP | 2019-10191 A | 1/2019 |

* cited by examiner

*Primary Examiner* — Raeann Gorden
(74) *Attorney, Agent, or Firm* — Sughrue Mion, PLLC

(57) ABSTRACT

A golf ball composed of a core and a cover has a spin rate and a launch angle on approach shots at a head speed (HS) of 20 m/s or 10 m/s that satisfy formulas (1) and (2) below:

Spin *W*/Spin *D*≥0.70   (1)

Ang *W*/Ang *D*<1.20   (2).

Here, Spin D is the spin rate (rpm) under dry conditions, Spin W is the spin rate (rpm) under wet conditions, Ang W is the launch angle (°) under wet conditions and Ang D is the launch angle (°) under dry conditions. The golf ball suppresses a decrease in the spin rate on approach shots in rainy weather and thus has an improved controllability, making it especially useful to professional golfers and skilled amateurs who desire a high spin performance around the green.

10 Claims, No Drawings

GOLF BALL

CROSS-REFERENCE TO RELATED APPLICATION

This non-provisional application claims priority under 35 U.S.C. § 119(a) on Patent Application No. 2019-231164 filed in Japan on Dec. 23, 2019, the entire contents of which are hereby incorporated by reference.

TECHNICAL FIELD

The present invention relates to a multilayer golf ball of two or more pieces that has a cover and a cover. More particularly, the invention relates to a golf ball capable of suppressing a decrease in the spin rate on approach shots under wet conditions.

BACKGROUND ART

Golf balls, when used under dry, fair weather conditions, achieve a sufficient distance on shots with a driver and also incur a suitable amount of spin on approach shots that require controllability, and so are not regarded as problematic. However, golf balls are known to be less receptive to spin and to have decreased controllability under wet conditions during rainy weather. Professional golfers and skilled amateurs in particular desire a high spin performance around the green, regardless of the weather.

Art relating to golf balls that suppress a decrease in the spin rate on approach shots such as with a short iron during rainy weather—i.e., when the ball is wet—is described in, for example, JP-A 2011-72836. JP-A 2010-179119, JP-A 2007-296383. JP-A 2002-186686, JP-A 2002-186687, JP-A 2019-10190 and JP-A 2019-10191. However, in these golf balls, the spin rate on shots with a driver (W #1) when the ball is wet sometimes ends up rising, which may lower the distance traveled by the ball. Also, the golf balls disclosed in JP-A 2019-10190 and JP-A 2019-10191 do not take into account the variability of the spin rate and launch angle on approach shots in rainy weather, and so there exists a desire for further improvement in ball controllability on approach shots when the ball is wet.

SUMMARY OF THE INVENTION

It is therefore an object of the present invention to provide a golf ball which, in rainy weather, i.e., when the ball is wet, suppresses a decrease in the distance traveled by the ball due to an increased spin rate on driver shots and also fully suppresses a decrease in the spin rate on approach shots, thereby enhancing the controllability.

As a result of extensive investigations, we have found that when a golf ball having a core and a cover is fabricated so as to satisfy the following spin rate retention and launch angle retention formulas:

$$\text{Spin } W/\text{Spin } D \geq 0.70 \tag{1}$$

$$\text{Ang } W/\text{Ang } D < 1.20 \tag{2},$$

wherein Spin D is the spin rate (rpm) under dry conditions, Spin W is the spin rate (rpm) under wet conditions, Ang W is the launch angle (°) under wet conditions and Ang D is the launch angle (°) under dry conditions, the golf ball minimizes the decrease in spin rate on approach shots in rainy weather—i.e., when wet—and thus has an improved controllability, making it particularly useful to professional golfers and skilled amateurs who desire a high spin performance around the green.

Accordingly, in a first aspect, the present invention provides a golf ball having a core and a cover, which ball has a spin rate and a launch angle on approach shots at a head speed (HS) of 20 m's that satisfy formulas (1) and (2) below:

$$\text{Spin } W/\text{Spin } D \geq 0.70 \tag{1}$$

$$\text{Ang } W/\text{Ang } D < 1.20 \tag{2},$$

wherein Spin D is the spin rate (rpm) under dry conditions, Spin W is the spin rate (rpm) under wet conditions, Ang W is the launch angle (°) under wet conditions and Ang D is the launch angle (°) under dry conditions.

In a second aspect, the invention provides a golf ball having a core and a cover, which ball has a spin rate and a launch angle on approach shots at a head speed (HS) of 10 rills that satisfy formulas (1) and (2) below:

$$\text{Spin } W/\text{Spin } D \geq 0.70 \tag{1}$$

$$\text{Ang } W/\text{Ang } D < 1.20 \tag{2},$$

wherein Spin D is the spin rate (rpm) under dry conditions, Spin W is the spin rate (rpm) under wet conditions, Ang W is the launch angle (°) under wet conditions and Ang D is the launch angle (°) under dry conditions.

In preferred embodiments of the golf balls according to the first and second aspects of the invention, the cover has an outermost layer on which a coating layer is formed, which coating layer is formed of a coating composition composed primarily of a urethane coating containing both a base resin comprising a polyester polyol and a curing agent comprising a polyisocyanate. The coating composition preferably includes from 0.1 to 10 parts by weight of a water-repellent additive per 100 parts by weight of the base resin, inclusive of a solvent. The water-repellent additive may be a fluorine-based water repellent or an acrylic additive. The acrylic additive may be composed of a silicone-modified acrylate. The fluorine-based water repellent may be composed of a fluorine-based polymer having an alkyl group chain length of 7 or less.

In the urethane coating, it is preferable for hexamethylene diisocyanate to be used as the polyisocyanate, with both an isocyanurate and an adduct of the hexamethylene diisocyanate being used together. The mixing ratio of the isocyanurate and the adduct of hexamethylene diisocyanate, expressed as the weight ratio "isocyanurate/adduct," is preferably from 95/5 to 40/60.

Advantageous Effects of the Invention

The golf ball of the invention minimizes the decrease in spin rate on approach shots in rainy weather when the ball is wet, thus improving ball controllability. This makes the ball especially useful to professional golfers and skilled amateurs who desire a high spin performance around the green.

DESCRIPTION OF THE PREFERRED EMBODIMENTS

The objects, features and advantages of the invention will become more apparent from the following detailed description.

The golf ball of the invention has a core and a cover.

The core may be formed of a known rubber material as the base material. Known base rubbers that are natural rubbers or synthetic rubbers may be used as the base rubber. More specifically, the use of primarily a polybutadiene, especially a cis-1,4-polybutadiene having a cis structure content of at least 40%, is recommended. Where desired, a natural rubber, polyisoprene rubber, styrene-butadiene rubber or the like may be used together with the above-described polybutadiene in the base rubber.

The polybutadiene may be synthesized with a metal catalyst, such as a neodymium or other rare-earth catalyst, a cobalt catalyst or a nickel catalyst.

Co-crosslinking agents such as unsaturated carboxylic acids and metal salts thereof, inert fillers such as zinc oxide, barium sulfate and calcium carbonate, organic peroxides such as dicumyl peroxide and 1,1-bis(t-butylperoxy)cyclohexane, and other additives may be included in the base rubber. Where necessary, commercial antioxidants and the like may be suitably added as well.

Various types of thermoplastic resins and thermoset resins commonly used as cover stock in golf balls may be used as the cover-forming material. It is preferable in particular to employ a cover composed primarily of a thermoplastic polyurethane or other type of urethane resin (collectively referred to below as "polyurethane") or a polyurea. Details on these are provided below.

Polyurethane

The polyurethane has a structure which includes soft segments composed of a polymeric polyol (polymeric glycol) that is a long-chain polyol, and hard segments composed of a chain extender and a polyisocyanate. Here, the polymeric polyol serving as a starting material may be any that has hitherto been used in the art relating to polyurethane materials, and is not particularly limited. This is exemplified by polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. Specific examples of polyester polyols that may be used include adipate-type polyols such as polyethylene adipate glycol, polypropylene adipate glycol, polybutadiene adipate glycol and polyhexamethylene adipate glycol; and lactone-type polyols such as polycaprolactone polyol. Examples of polyether polyols include polyethylene glycol), poly(propylene glycol), poly(tetramethylene glycol) and poly(methyl tetramethylene glycol). One of these may be used alone or two or more may be used together.

The long-chain polyol preferably has a number-average molecular weight in the range of 1,000 to 5,000. By using a long-chain polyol having a number-average molecular weight in this range, golf balls made with a polyurethane composition that have excellent properties, including a good rebound and a good productivity, can be reliably obtained. The number-average molecular weight of the long-chain polyol is more preferably in the range of 1,500 to 4,000, and even more preferably in the range of 1,700 to 3,500.

Here and below, "number-average molecular weight" refers to the number-average molecular weight calculated based on the hydroxyl value measured in accordance with JIS-K1557.

The chain extender is not particularly limited; any chain extender that has hitherto been employed in the art relating to polyurethanes may be suitably used. In this invention, low-molecular-weight compounds with a molecular weight of 2,000 or less which have on the molecule two or more active hydrogen atoms capable of reacting with isocyanate groups may be used. Of these, preferred use can be made of aliphatic diols having from 2 to 12 carbon atoms. Specific examples include 1,4-butylene glycol, 1,2-ethylene glycol, 1,3-butanediol, 1,6-hexanediol and 2,2-dimethyl-1,3-propanediol. Of these, the use of 1,4-butylene glycol is especially preferred.

Any polyisocyanate hitherto employed in the art relating to polyurethanes may be suitably used without particular limitation as the polyisocyanate. For example, use can be made of one or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate, 1,4-bis(isocyanatomethyl)cyclohexane and dimer acid diisocyanate. Depending on the type of isocyanate used, crosslinking reactions during injection molding may be difficult to control.

The ratio of active hydrogen atoms to isocyanate groups in the polyurethane-forming reaction may be suitably adjusted within a preferred range. Specifically, in preparing a polyurethane by reacting the above long-chain polyol, polyisocyanate and chain extender, it is preferable to use the respective components in proportions such that the amount of isocyanate groups included in the polyisocyanate per mole of active hydrogen atoms on the long-chain polyol and the chain extender is from 0.95 to 1.05 moles.

The method of preparing the polyurethane is not particularly limited. Preparation using the long-chain polyol, chain extender and polyisocyanate may be carried out by either a prepolymer process or a one-shot process via a known urethane-forming reaction. Of these, melt polymerization in the substantial absence of solvent is preferred. Production by continuous melt polymerization using a multiple screw extruder is especially preferred.

It is preferable to use a thermoplastic polyurethane material as the polyurethane. The thermoplastic polyurethane material may be a commercial product, examples of which include those available under the trade name Pandex from DIC Covestro Polymer, Ltd., and those available under the trade name Resamine from Dainichiseika Color & Chemicals Mfg. Co., Ltd.

Polyurea

The polyurea is a resin composition composed primarily of urea linkages formed by reacting (i) an isocyanate with (ii) an amine-terminated compound. This resin composition is described in detail below.

(i) Isocyanate

Suitable use can be made here of an isocyanate that is employed in the prior art relating to polyurethanes, although the isocyanate is not particularly limited. Use may be made of isocyanates similar to those described above in connection with the polyurethane material.

(ii) Amine-Terminated Compound

An amine-terminated compound is a compound having an amino group at the end of the molecular chain. In this invention, the long-chain polyamines and/or amine curing agents shown below may be used.

A long-chain polyamine is an amine compound which has on the molecule at least two amino groups capable of reacting with isocyanate groups, and which has a number-average molecular weight of from 1,000 to 5,000. In this invention, the number-average molecular weight is more preferably from 1,500 to 4,000, and even more preferably from 1,900 to 3,000. Examples of such long-chain polyamines include, but are not limited to, amine-terminated hydrocarbons, amine-terminated polyethers, amine-terminated polyesters, amine-terminated polycarbonates, amine-terminated polycaprolactones, and mixtures thereof. These long-chain polyamines may be used singly, or two or more may be used in combination.

An amine curing agent is an amine compound which has on the molecule at least two amino groups capable of reacting with isocyanate groups, and which has a number-average molecular weight of less than 1,000. In this invention, the number-average molecular weight is more preferably less than 800, and even more preferably less than 600. Specific examples of such amine curing agents include, but are not limited to, ethylenediamine, hexamethylenediamine, 1-methyl-2,6-cyclohexyldiamine, tetrahydroxypropylene ethylenediamine, 2,2,4- and 2,4,4-trimethyl-1,6-hexanediamine, 4,4'-bis(sec-butylamino)dicyclohexylmethane, 1,4-bis(sec-butylamino)cyclohexane, 1,2-bis(sec-butylamino) cyclohexane, derivatives of 4,4'-bis(sec-butylamino) dicyclohexylmethane, 4,4'-dicyclohexylmethanediamine, 1,4-cyclohexane bis(methylamine), 1,3-cyclohexane bis(methylamine), diethylene glycol di(aminopropyl) ether, 2-methylpentamethylenediamine, diaminocyclohexane, diethylenetriamine, triethylenetetramine, tetraethylenepentamine, propylenediamine, 1,3-diaminopropane, dimethylaminopropylamine, diethylaminopropylamine, dipropylenetriamine, imidobistpropylamine), monoethanolamine, diethanolamine, triethanolamine, monoisopropanolamine, diisopropanolamine, isophoronediamine, 4,4'-methylenebis (2-chloroaniline), 3,5-dimethylthio-2,4-toluenediamine, 3,5-dimethylthio-2,6-toluenediamine, 3,5-diethylthio-2,4-toluenediamine, 3,5-diethylthio-2,6-toluenediamine, 4,4'-bis (sec-butylamino)diphenylmethane and derivatives thereof, 1,4-bis(sec-butylamino)benzene, 1,2-bis(sec-butylamino) benzene, N,N'-dialkylaminodiphenylmethane, N,N,N',N'-tetrakis(2-hydroxypropyl)ethylenediamine, trimethylene glycol di-p-aminobenzoate, polytetramethylene oxide di-p-aminobenzoate, 4,4'-methylenebis(3-chloro-2,6-diethyleneaniline), 4,4'-methylenebis(2,6-diethylaniline), m-phenylenediamine, p-phenylenediamine and mixtures thereof. These amine curing agents may be used singly or two or more may be used in combination.

(iii) Polyol

Although not an essential ingredient, in addition to the above-described components (i) and (ii), a polyol may also be included in the polyurea. The polyol is not particularly limited, but is preferably one that has hitherto been used in the art relating to polyurethanes. Specific examples include the long-chain polyols and polyol curing agents mentioned below.

The long-chain polyol may be any that has hitherto been used in the art relating to polyurethanes. Examples include, but are not limited to, polyester polyols, polyether polyols, polycarbonate polyols, polyester polycarbonate polyols, polyolefin-based polyols, conjugated diene polymer-based polyols, castor oil-based polyols, silicone-based polyols and vinyl polymer-based polyols. These long-chain polyols may be used singly or two or more may be used in combination.

The long-chain polyol has a number-average molecular weight of preferably from 1,000 to 5,000, and more preferably from 1,700 to 3,500. In this number-average molecular weight range, an even better rebound and productivity are obtained.

The polyol curing agent is preferably one that has hitherto been used in the art relating to polyurethanes, but is not subject to any particular limitation. In this invention, use may be made of a low-molecular-weight compound having on the molecule at least two active hydrogen atoms capable of reacting with isocyanate groups, and having a molecular weight of less than 1,000. Of these, the use of aliphatic diols having from 2 to 12 carbon atoms is preferred. Specific examples include 1,4-butylene glycol, 1,2-ethylene glycol, 1,3-butanediol, 1,6-hexanediol and 2,2-dimethyl-1,3-propanediol. The use of 1,4-butylene glycol is especially preferred. The polyol curing agent has a number-average molecular weight of preferably less than 800, and more preferably less than 600.

A known method may be used to produce the polyurea. A prepolymer process, a one-shot process or some other known method may be suitably selected for this purpose.

Resin materials other than the above resin ingredients may also be included for such purposes as to further enhance the flowability of the golf ball resin composition and increase such ball properties as the rebound and scuff resistance.

Examples of other resin materials that may be used include polyester elastomers, polyamide elastomers, ionomer resins, ethylene-ethylene/butylene-ethylene block copolymers and modified forms thereof, polyacetals, polyethylenes, nylon resins, methacrylic resins, polyvinyl chlorides, polycarbonates, polyphenylene ethers, polyarylates, polysulfones, polyethersulfones, polyetherimides and polyamideimides. These may be used singly or two or more may be used together.

The above cover-forming resin composition may include an isocyanate compound. By including an isocyanate compound, due to reactions between the polyurethane or polyurea serving as the base resin and the isocyanate compound, not only can the scuff resistance of this resin composition be further enhanced, the flowability increases on account of the plasticising effect of the isocyanate, enabling the moldability to be enhanced.

Any isocyanate compound employed in conventional polyurethanes may be used without particular limitation as the above isocyanate compound. For example, aromatic isocyanate compounds that may be used include 2,4-toluene diisocyanate, 2,6-toluene diisocyanate and mixtures of both, 4,4-diphenylmethane diisocyanate, m-phenylene diisocyanate and 4,4'-biphenyl diisocyanate. Use can also be made of the hydrogenated forms of these aromatic isocyanate compounds, such as dicyclohexylmethane diisocyanate. Other isocyanate compounds that may be used include aliphatic diisocyanates such as tetramethylene diisocyanate, hexamethylene diisocyanate (HDL) and octamethylene diisocyanate; and alicyclic diisocyanates such as xylene diisocyanate. Further examples of isocyanate compounds that may be used include blocked isocyanate compounds obtained by reacting the isocyanate groups on a compound having two or more isocyanate groups on the ends with a compound having active hydrogens, and uretdiones obtained by the dimerization of isocyanate.

The amount of the above isocyanate compounds included per 100 parts by weight of the polyurethane or polyurea resin is preferably at least 0.1 part by weight, and more preferably at least 0.5 part by weight. The upper limit is preferably not more than 30 parts by weight, and more preferably not more than 20 pans by weight. When too little is included, a sufficient crosslinking reaction may not be obtained and an increase in the properties may not be observable. On the other hand, when too much is included, discoloration over time due to heat and ultraviolet light may increase, or problems such as a loss of thermoplasticity or a decline in resilience may arise.

In addition, optional additives may be suitably included in the above resin composition according to the intended use thereof. For example, when this resin composition is to be used as a cover material, various additives, such as inorganic fillers, organic staple fibers, reinforcing agents, crosslinking agents, pigments, dispersants, antioxidants, ultraviolet absorbers and light stabilizers, may be added to the above ingredients. When such additives are included, the amount thereof per 100 parts by weight of the base resin is preferably at least 0.1 part by weight, and more preferably at least 0.5 part by weight, but preferably not more than 10 parts by weight, and more preferably not more than 4 parts by weight.

The method of molding the cover may involve, for example, feeding the above resin composition into an injection molding machine and molding the cover by injecting the molten resin composition over the core. In this case, the molding temperature differs according to the type of polyurethane or polyurea, but is typically in the range of 150 to 270° C.

At least one intermediate layer may be placed between the core and the cover. In this case, various types of thermoplastic resins, especially ionomeric resins, that are used as golf ball cover materials may be suitably used as the intermediate layer material. A commercial product may be used as the ionomeric resin. Alternatively, the resin material used in the intermediate layer may be one obtained by blending, of commercially available ionomeric resins, a high-acid ionomeric resin having an acid content of at least 16 wt % with an ordinary ionomeric resin. With such a blend, a good distance on shots with a driver (W #1) can be obtained due to a high rebound and a reduced spin rate. The amount of unsaturated carboxylic acid included (acid content) in such a high-acid ionomeric resin is typically at least 16 wt %, preferably at least 17 wt %, and more preferably at least 18 wt %. The upper limit is preferably 22 wt % or less, more preferably 21 wt % or less, and even more preferably 20 wt % or less.

It is desirable to abrade the surface of the intermediate layer in order to increase adhesion between the intermediate layer material and the polyurethane resin composition that is preferably used in the cover material. Moreover, it is desirable to apply a primer (adhesive) to the surface of the intermediate layer following such abrasion treatment or to add an adhesion reinforcing agent to the intermediate layer material.

The intermediate layer has a material hardness on the Shore D hardness scale of preferably at least 61, more preferably at least 62, and even more preferably at least 63. The upper limit is preferably not more than 72, more preferably not more than 70, and even more preferably not more than 68. When the intermediate layer is softer than this range, the ball rebound on full shots with a driver (W #1) or an iron may be inadequate or the ball may be too receptive to spin, as a result of which a good distance may not be achieved. On the other hand, when the intermediate layer is harder than the above range, the durability of the ball to cracking on repeated impact may worsen or the feel at impact may become too hard.

The intermediate layer has a thickness which is preferably at least 0.8 mm, more preferably at least 1.0 mm, and even more preferably at least 1.1 mm. The upper limit is preferably not more than 1.7 mm, and more preferably not more than 1.5 mm. Outside of this range, the spin rate-lowering effect on driver (W #1) shots may be inadequate and so a good distance may not be achieved.

Numerous dimples may be formed on the outside surface of the cover serving as the outermost layer. The number of dimples arranged on the cover surface, although not particularly limited, is preferably at least 250, more preferably at least 300, and even more preferably at least 320. The upper limit is preferably not more than 440, more preferably not more than 40), and even more preferably not more than 360. When the number of dimples is higher than this range, the ball trajectory may become lower and the distance traveled by the ball may decrease. On the other hand, when the number of dimples is lower that this range, the ball trajectory may become higher and a good distance may not be achieved. The arrangement of these dimples may have symmetry that follows a tetrahedral, octahedral, dodecahedral or other polyhedral/polygonal shape, or may have rotational symmetry along an axis connecting the poles of the ball.

Tt is recommended that preferably two or more dimple types, and more preferably three or more dimple types, of mutually differing diameter and/or depth be formed. With regard to the planar shapes of the dimples, a single dimple shape or a combination of two or more dimple shapes, such as circular shapes, various polygonal shapes, dewdrop shapes and oval shapes, may be suitably used. For example, when circular dimples are used, the dimple diameter may be set to at least about 2.5 mm and up to about 6.5 mm, and the dimple depth may be set to at least 0.07 mm and up to 0.30 mm. The cross-sectional shapes of the dimples may be defined as one or a combination of two or more types, including arcuate shapes, conical shapes, flat-bottomed shapes and curves expressed by various functions, and may have, other than near the dimple edges, a plurality of inflection points.

In order for the aerodynamic properties to be fully manifested, it is desirable for the dimple coverage ratio, i.e., the dimple surface coverage SR, which is the collective surface area of the imaginary spherical surfaces circumscribed by the edges of the individual dimples, as a percentage of the spherical surface area of the golf ball, to be set to at least 70% and not more than 90%. Also, to optimize the ball trajectory, it is desirable for the value Vo, defined as the spatial volume of the individual dimples below the flat plane circumscribed by the dimple edge, divided by the volume of the cylinder whose base is the flat plane and whose height is the maximum depth of the dimple from the base, to be set to at least 0.35 and not more than 0.80. Moreover, it is preferable for the ratio VR of the sum of the volumes of the individual dimples, each formed below the flat plane circumscribed by the edge of the dimple, with respect to the volume of the ball sphere were the ball to have no dimples on its surface, to be set to at least 0.6% and not more than 1.0%. Outside of the above ranges in these respective values, the resulting trajectory may not enable a good distance to be achieved and so the ball may fail to travel a fully satisfactory distance. Also, to satisfy the rule for symmetry of the ball's carry, dimple volumes near the poles may be made smaller, and dimple volumes near the equator may be made larger, than the volumes of dimples away from the poles and the equator.

A coating layer may be formed on the cover surface serving as the outermost layer. This coating layer can be applied using any of various types of coatings. Given the need for the coating to endure the harsh conditions of golf ball use, it is preferable to use a coating composition made up primarily of a urethane coating composed of a polyol and a polyisocyanate.

Polyols that may be used in the coating composition are not particularly limited and include, for example, acrylic polyols and polyester polyols. These polyols encompass also modified forms thereof. Other polyols may also be added in order to increase the ease of the coating operation.

One type of polyester polyol may be suitably used as the polyol component, or two types of polyester polyol may be used together, in which case the two types of polyester polyols are designated as component A and component B. These two types of polyester polyol have differing weight-average molecular weights (Mw), the weight-average molecular weight of component A being preferably from 20,000 to 30,000 and the weight-average molecular weight of component B being preferably from 800 to 1,500. The weight-average molecular weight of component A is more preferably from 22,000 to 29,000, and even more preferably from 23,000 to 28,000. The weight-average molecular weight of component B is more preferably from 900 to 1,200 and even more preferably from 1,000 to 1,100.

The two types of polyester polyol can be obtained by the polycondensation of a polyol with a polybasic acid. Examples of the polyol include diols such as ethylene glycol, 1,2-propanediol, 1,3-propanediol, 1,3-butanediol, 1,4-butanediol, 1,6-hexanediol, neopettyl glycol, diethylene glycol, dipropylene glycol, hexylene glycol, dimethylolheptane, polyethylene glycol and polypropylene glycol, as well as triols, tetraols, and polyols having an alicyclic structure. Examples of the polybasic acid include aliphatic dicarboxylic acids such as succinic acid, adipic acid, sebacic acid, azelaic acid and dimer acid; aliphatic unsaturated dicarboxylic acids such as fumaric acid, maleic acid, itaconic acid and citraconic acid; aromatic polycarboxylic acids such as phthalic acid, isophthalic acid, terephthalic acid, trimellitic acid and pyromellitic acid; dicarboxylic acids having an alicyclic structure, such as tetrahydrophthalic acid, hexahydrophthalic acid, 1,3-cyclohexanedicarboxylic acid, 1,4-cyclohexanedicarboxylic acid and endomethylene tetrahydrophthalic acid; and tris-2-carboxyethyl isocyanurate. In particular, a polyester polyol in which a cyclic structure has been introduced onto the resin backbone may be used as the polyester polyol serving as component A. Examples include polyester polyols obtained by the polycondensation of a polyol having an alicyclic structure, such as cyclohexane dimethanol, with a polybasic acid; and polyester polyols obtained by the polycondensation of a polyol having an alicyclic structure with a diol or triol and a polybasic acid. A polyester polyol having a hyperbranched structure may be used as the polyester polyol serving as component B. Examples include polyester polyols having a branched structure, such as NIPPOLAN 800, from Tosoh Corporation.

The weight-average molecular weight (Mw) of the overall base resin composed of the above two types of polyester polyol is preferably from 13.000 to 23,000, and more preferably from 15,000 to 22,000. The number-average molecular weight (Mn) of the overall base resin composed of the above two types of polyester polyol is preferably from 1,100 to 2,000, and more preferably from 1,300 to 1,850. If these average molecular weights (Mw and Mn) fall outside of the above ranges, the wear resistance of the coating layer may decrease. The weight-average molecular weight and number-average molecular weight are polystyrene-equivalent values measured by gel permeation chromatography (GPC) using detection with a differential refractometer.

The contents of these two types of polyester polyol (components A and B) are not particularly limited, although it is preferable for the component A content to be from 20 to 30 wt % and the component B content to be from 2 to 18 wt % of the overall base resin.

In cases where one type of polyester polyol is used, of the two above types of polyester polyol (components A and B), it is preferable to use the polyester polyol of component A.

As for the polyisocyanate, although not particularly limited, an aromatic, aliphatic, alicyclic or other polyisocyanate is commonly used. Specific examples include tolylene diisocyanate, diphenylmethane diisocyanate, xylylene diisocyanate, tetramethylene diisocyanate, hexamethylene diisocyanate, lysine diisocyanate, isophorone diisocyanate, 1,4-cyclohexylene diisocyanate, naphthalene diisocyanate, trimethylhexamethylene diisocyanate, dicyclohexylmethane diisocyanate and 1-isocyanto-3,3,5-trimethyl-4-isocyanatomethylcyclohexane. These may be used singly or in admixture.

Modified forms of hexamethylene diisocyanate include, for example, polyester-modified hexamethylene diisocyanate and urethane-modified hexamethylene diisocyanate. Derivatives of hexamethylene diisocyanate include isocyanurates, biurets and adducts of hexamethylene diisocyanate. Using the hexamethylene diisocyanate is preferable from the standpoint of obtaining a thermoplastic urethane coating layer of excellent yellowing resistance and flexibility.

By using both an adduct having excellent flexibility and a relatively tough isocyanurate as the hexamethylene diisocyanate (HMDI), a high spin performance can be obtained in the golf ball. As used herein, "adduct" refers to an addition product of diisocyanate and trimethylolpropane, and "isocyanurate" refers to a diisocyanate trimer.

A commercial product may be used as the hexamethylene diisocyanate (HMDI) isocyanurate. Illustrative examples include Coronate® 2.357 (Tosoh Corporation), Sumidur N3300 (Sumika Covestro Urethane Co., Ltd.), Duranaten™ TPA-100 (Asahi Kasei Corporation), Takenate™ D170N and Takenate™ D177N (both from Mitsui Chemicals, Inc.), and Burnock DN-980 (DIC Corporation).

A commercial product may be used as the hexamethylene diisocyanate (HMDI) adduct. Illustrative examples include Coronate® HL (Tosoh Corporation), Takenate™ D160N (Mitsui Chemicals, Inc.), Duranate™ F402-80B and Duranate™ FA05-70B (both from Asahi Kasei Corporation, and Burnock DN-955 and Burnock DN-955S (both from DIC Corporation).

As subsequently described, from the standpoint of obtaining the desired spin rate retention and launch angle retention under wet conditions, the mixing ratio of hexamethylene diisocyanate isocyanurate and hexamethylene diisocyanate adduct, expressed as the weight ratio isocyanurate/adduct, is preferably from 95/5 to 40/60, and more preferably from 80/20 to 55/45.

The molar ratio of hydroxyl groups (OH) on the polyester polyol to isocyanate groups (NCO) on the polyisocyanate, expressed as NCO/OH, is preferably at least 0.6, and more preferably at least 0.65. The upper limit is preferably 1.5 or less, more preferably 1.0 or less, and even more preferably 0.9 or less. When this molar ratio is lower than 0.6, unreacted hydroxyl groups may remain and the performance and water resistance as a golf ball coating layer may worsen. On the other hand, when the molar ratio is greater than 1.5, the large excess of isocyanate groups may react with moisture to form fragile urea bonds, as a result of which the performance of the golf ball coating layer may decline.

An amine catalyst or an organometallic catalyst may be used as the curing catalyst (organometallic compound). A metallic soap of aluminum, nickel, zinc, tin or the like that has hitherto been compounded as a curing agent for two-part curable urethane coatings may be suitably used as this organometallic compound.

Known compounding ingredients for coatings may be optionally included in the coating composition. For example, thickeners, ultraviolet absorbers, fluorescent whiteners, slip agents and pigments may be suitably included.

In the practice of the invention, as subsequently described, in order to obtain the desired spin rate retention and launch angle retention under wet conditions, it is preferable to include a water-repellent additive. Examples of water-repellent additives that may be used include, without particular limitation, silicone resins, silicone fluids, silicone rubbers, fluorocarbon surfactants, acrylic additives and hydrophobic silicas, as well as combinations of these. The acrylic additive, although not particularly limited, may be a silicone-modified acrylate. As used herein, a "silicone-modified acrylate" refers to a surface conditioner in which a silicone structure has been incorporated into the acrylate backbone of the molecule. When a polysiloxane chain is attached to the acrylic backbone, unlike conventional polyrotaxane-type silicones, slip does not readily occur even when the amount of addition is increased, enabling the water repellency to be enhanced. Examples of silicone-modified acrylates include those available under the trade names BYK 3550 and BYK 3700 (both from BYK-Chemie GmbH), and 8BS Series (Taisei Chemical). Exemplary silicone fluids include methyl hydrogen silicone fluids and dimethyl silicone fluids.

Fluorocarbon surfactants are able to achieve a high water repellency at a smaller amount of addition than ordinary hydrocarbon-based surfactants and silicone-based surfactants. Exemplary fluorocarbon surfactants include, without particular limitation, tetrafluoroethylene and polytetrafluoroethylene. Fluorocarbon surfactants having perfluoroalkyl groups with an alkyl group chain length of 7 or less are especially preferred. Specific examples of such fluorocarbon surfactants include those available under the trade names S-242, S-243, S-420 and 5-421 (all from AGC Seimi Chemical Co., Ltd.).

The water-repellent additive is preferably used by adding it to the polyol component serving as the base resin. The content of the water-repellent additive relative to the overall base resin (100 wt %) is preferably at least 0.05 wt %, and more preferably at least 0.1 wt %, but preferably not more than 10 wt %, and more preferably not more than 5 wt %.

When the above coating composition is used, a coating layer can be formed on the surface of a conventionally manufactured golf ball by first preparing the coating composition at the time of application, applying the coating composition onto the ball surface via a conventional painting step and then drying the applied composition in a drying step. Although not particularly limited, preferred use can be made of spray painting, electrostatic painting or dipping as the method of application.

As described above, the coating composition for golf balls uses a polyol component as the base resin and a polyisocyanate as the curing agent. Depending on the painting conditions, various organic solvents may be mixed in. Such organic solvents include aromatic solvents such as toluene, xylene and ethylbenzene; ester solvents such as ethyl acetate, butyl acetate, propylene glycol methyl ether acetate and propylene glycol methyl ether propionate; ketone solvents such as acetone, methyl ethyl ketone, methyl isobutyl ketone and cyclohexanone; ether solvents such as diethylene glycol dimethyl ether, diethylene glycol diethyl ether and dipropylene glycol dimethyl ether, alicyclic hydrocarbon solvents such as cyclohexane, methylcyclohexane and ethylcyclohexane; and petroleum hydrocarbon solvents such as mineral spirits.

The above drying step may be the same as for known two-part curable urethane coatings. The coating composition of the invention may be dried at a drying temperature of at least about 40° C., and especially between 40° C. and 60° C., and for a drying period of 20 to 90 minutes, especially 40 to 50 minutes.

The coating layer thickness, although not particularly limited, is preferably from 3 to 50 μm, and more preferably from 5 to 20 μm.

It is critical for the golf ball according to the first aspect of the invention to have a spin rate and a launch angle on approach shots at a head speed (HS) of 20 m % s that satisfy formulas (1) and (2) below:

$$\text{Spin } W/\text{Spin } D \geq 0.70 \tag{1}$$

$$\text{Ang } W/\text{Ang } D < 1.20 \tag{2}$$

In the formulas, Spin D represents the spin rate (rpm) under dry conditions, Spin W represents the spin rate (rpm) under wet conditions, Mg W represents the launch angle (°) under wet conditions and Ang D represents the launch angle (°) under dry conditions.

The "Spin W/Spin D" ratio represents the spin rate retention. The closer this ratio is to 1.0, the smaller the amount of decrease in the spin rate under wet conditions and the easier the ball is to control, which is desirable. On the other hand, when this ratio has a small value, the amount of decrease in the spin rate under wet conditions becomes large, making the ball more difficult to control, which is undesirable. This value must be at least 0.70, and is preferably at least 0.75, and more preferably at least 0.80.

Also, the "Ang W/Ang D" ratio represents the launch angle retention. The closer this ratio is to 1.0, the smaller the rise in the launch angle under wet conditions and the easier it is to adjust the distance traveled by the ball, which is desirable. On the other hand, when this ratio has a large value, the rise in the launch angle under wet conditions becomes large, making it more difficult to adjust the distance traveled by the ball, which is undesirable. This value must be less than 1.20, and is preferably 1.15 or less, and more preferably 1.10 or less.

It is critical for the golf ball according to the second aspect of the invention to have a spin rate and a launch angle on approach shots at a head speed (HS) of 10 m/s that satisfy formulas (1) and (2) below:

$$\text{Spin } W/\text{Spin } D \geq 0.70 \tag{1}$$

$$\text{Ang } W/\text{Ang } D < 1.20 \tag{2}$$

The golf ball of the invention can be made to conform to the Rules of Golf for play and may be formed to a diameter which is such that the ball does not pass through a ring having an inner diameter of 42.672 mm and is not more than 42.80 mm, and to a weight which is preferably between 45.0 and 45.93 g.

EXAMPLES

The following Examples and Comparative Examples are provided to illustrate the invention, and are not intended to limit the scope thereof.

Examples 1 to 4. Comparative Examples 1 to 6

A core-forming rubber composition formulated as shown in Table 1 for the respective Examples in Examples 1, 2 and Comparative Examples 1 to 3 was prepared and then molded and vulcanized to produce a 38.65 mm diameter core. In Examples 3, 4, a core-forming rubber composition formulated as shown in Table 1 is prepared and then molded and vulcanized to produce a 38.65 mm diameter core.

TABLE 1

| | | A | B |
|---|---|---|---|
| Core formulation (pbw) | Polybutadiene | 100 | 100 |
| | Unsaturated metal carboxylate | 37.4 | 34.1 |
| | Organic peroxide | 1.0 | 1.0 |
| | Antioxidant | 0.1 | 0.1 |
| | Zinc oxide | 14.5 | 15.8 |
| | Zinc salt of pentachlorothiophenol | 0.6 | 0.6 |
| | Water | 0.6 | 0.6 |
| Valcanization conditions | Temperature (° C.) | 152 | 152 |
| | Time (min) | 19 | 19 |

Details on the above core material are given below.

Polybutadiene: Available under the trade name "BR 01" from JSR Corporation

Unsaturated metal carboxylate:
  Zinc acrylate (from Wako Pure Chemical industries, Ltd.)

Organic peroxide: Dicumyl peroxide, available under the trade name "Percumyl D" from NOF Corporation Antioxidant: Available under the trade name "Nocrac NS6" from Ouchi Shinko Chemical Industry Co., Ltd.

Zinc oxide: Available as "Zinc Oxide Grade 3" from Sakai Chemical Co., Ltd.

Zinc salt of pentachlorothiophenol:
  Available from Wako Pure Chemical Industries, Ltd.

Water: distilled water (Wako Pure Chemical industries, Ltd.)

Next, intermediate layer-forming resin material No. 1 or No. 2 shown in Table 2 was injection-molded over the core, thereby producing intermediate layer-encased spheres having a 1.2 mm thick intermediate layer.

Cover materials No. 3 to No. 5 shown in Table 2 were then injection-molded over the intermediate layer-encased spheres, thereby producing three-piece golf balls having a 0.8 mm-thick cover (outermost layer). Dimples common to all of the Examples were formed at this time on the surface of the ball cover in each Example.

In Examples 3, 4, an intermediate layer and a cover are formed by the same way as described above, thereby producing three-piece golf balls having a 0.8 mm-thick cover (outermost layer). A plurality of given dimples common to all the Examples and Comparative Examples are formed at this time on the surface of the cover.

TABLE 2

| Resin component (pbw) | Acid content (wt %) | No. 1 | No. 2 | No. 3 | No. 4 | No. 5 |
|---|---|---|---|---|---|---|
| AM 7318 | 18 | 85 | | | | |
| Himilan 1706 | 15 | | 35 | | | |
| Himilan 1557 | 12 | 15 | 15 | | | |
| Himilan 1605 | 15 | | 50 | | | |
| Polyurethane (1) | | | | 100 | | |
| Polyurethane (2) | | | | | 100 | |
| Polyurethane (3) | | | | | | 100 |
| Trimethylolpropane (TMP) | | 1.1 | 1.1 | | | |
| Shore D hardness | | 65 | 64 | 43 | 47 | 50 |

Trade names for the chief materials in this table are given below.

AM 7318, Himilan 1706, Himilan 1557, Himilan 1605:
  Ionomers available from Dow-Mitsui Polychemicals Co., Ltd.

Polyurethane (1): Ether-type thermoplastic polyurethane available from DIC Covestro Polymer, Ltd.; Shore D hardness, 43

Polyurethane (2): Ether-type thermoplastic polyurethane available from DIC Covestro Polymer, Ltd.; Shore D hardness, 47

Polyurethane (3): Ether-type thermoplastic polyurethane available from DIC Covestro Polymer, Ltd.; Shore D hardness, 50

Formation of Coating Layer

Next, in each Example, a coating formulated as shown in Table 3 below was applied with an air spray gun onto the surface of the outermost layer on which numerous dimples had been formed, thereby producing golf balls having a 15 μm-thick coating layer formed thereon.

In Examples 3, 4, a coating is applied onto the surface of the outermost layer as the same way as the above description, thereby producing golf balls having a 15 μm-thick coating layer formed thereon.

TABLE 3

| Coating formulation (pbw) | | I | II | III | IV | V |
|---|---|---|---|---|---|---|
| Base resin | Polyester polyol | 27.5 | 27.5 | 27.5 | 27.5 | 27.5 |
| | Additive Type | a | a | b | — | c |
| | Amount added | 1.95 | 0.5 | 1.95 | none | 0.5 |
| | Organic solvent | 72.5 | 72.5 | 72.5 | 72.5 | 72.5 |
| | (total) | (100) | (100) | (100) | (100) | (100) |
| Curing agent | Isocyanate | 51.5 | 51.5 | 51.5 | 51.5 | 51.5 |
| | Isocyanurate/adduct (relative proportions) | (90/10) | (90/10) | (90/10) | (90/10) | (100/0) |
| | Organic solvent | 48.5 | 48.5 | 48.5 | 48.5 | 48.5 |
| | (total) | (100) | (100) | (100) | (100) | (100) |

Polyester Polyol Synthesis Example

A reactor equipped with a reflux condenser, a dropping funnel, a gas inlet and a thermometer was charged with 140 parts by weight of trimethylolpropane, 95 parts by weight of ethylene glycol, 157 parts by weight of adipic acid and 58 parts by weight of 1,4-cyclohexanedimethanol. The temperature was then raised to between 200 and 240° C. under stirring and the reaction was effected by 5 hours of heating, after which a polyester polyol having an acid value of 4, a hydroxyl value of 170 and a weight-average molecular weight (Mw) of 28,000 was obtained. Next, the polyester polyol thus synthesized was dissolved in butyl acetate and the concentration of the polyester polyol component was adjusted to 27.5%.

With regard to the additive in Table 3, the water-repellent additives used were all commercial products. "Type a" was an acrylic additive (a silicone-modified acrylate available as BYK 3700 from BYK-Chemie GmbH). "Type b" was a fluorine-based water repellent (a fluorocarbon surfactant having perfluoroalkyl groups); a fluorine-based polymer having an alkyl group chain length of 7 or less was added. "Type c" was a silicone-based additive (a polyester-modified polysiloxane available as BYK 370 from BYK-Chemie GmbH).

As for the curing agent in Table 3, using Duranate™ TPA-100 (NCO content, 23.1%; nonvolatiles content, 100%) from Asahi Kasei Corporation as the hexamethylene diisocyanate (HMDI) isocyanurate and Duranate™ E402-80B (NCO content, 7.6%; nonvolatiles content, 80%) from Asahi Kasei Corporation as the HMDI adduct, these were included in the relative proportions shown in the table. The curing agent was adjusted to a polyisocyanate component concentration of 51.5% by subsequently adding N-butyl acetate as the organic solvent.

Commercial golf balls were used without modification in Comparative Examples 4 to 6. The names of these commercial balls were as follows.

Comparative Example 4: TITLEIST PRO V1X (2019 model), manufactured by the
Acushnet Company
Comparative Example 5: SRIXON Z-Star XV (2019 model), manufactured by Dunlop
Comparative Example 6: CALLAWAY CHROME SOFT X (2018 model), manufactured by the Callaway Golf Company Evaluation of Spin Rate and Launch Angle on Approach Shots The spin rate, launch angle and initial velocity of the golf ball under dry conditions and wet conditions were measured. Dry conditions involved hitting an ordinary golf ball. Wet conditions involved preparing a beaker filled with water, dipping the golf ball in this water and then hitting the ball in this water-wetted state (representing the ball in rainy weather).

The spin rate and launch angle of each of the dry-condition golf balls and wet-condition golf balls when struck at head speeds of 20 m/s and 10 m/s with a sand wedge (SW) mounted on a golf swing robot were measured, and the spin rate retention ratio and launch angle retention ratio were evaluated based on the criteria described below. Measurement was carried out with an apparatus for measuring the initial conditions immediately after the ball was struck. The sand wedge used was the TourB XW-1 (loft angle, 58°) manufactured by Bridgestone Sports Co., Ltd. The results are shown in Table 4 below.

Evaluation Criteria:
(1) Spin Rate Retention Ratio
    Good: Spin rate retention ratio was at least 0.70 and up to 1.00
    NG: Spin rate retention ratio was less than 0.70
(2) Launch Angle Retention Ratio
    Good: Launch angle retention ratio was at least 1.00 but less than 1.20
    NG: Launch angle retention ratio was 1.20 or more

TABLE 4

|  |  |  | Example | | | |
|---|---|---|---|---|---|---|
|  |  |  | 1 | 2 | 3 | 4 |
| Ball layers | Coating layer | | I | I | II | III |
| | Outermost layer | | No. 4 | No. 3 | No. 4 | No. 4 |
| | Intermediate layer | | No. 1 | No. 2 | No. 1 | No. 1 |
| | Core | | A | B | A | A |
| Sand wedge evaluation (HS, 20 m/s) | DRY | Initial velocity (m/s) | 17 | 17 | 17 | 17 |
| | | Launch angle (deg) | 33.0 | 32.9 | 33.0 | 33.0 |
| | | Spin rate (rpm) | 6,524 | 6,613 | 6,569 | 6,569 |
| | WET | Initial velocity (m/s) | 17 | 17 | 17 | 17 |
| | | Launch angle (deg) | 33.4 | 33.2 | 38.1 | 35.7 |
| | | Spin rate (rpm) | 6,420 | 6,598 | 4,926 | 5,762 |
| | Spin rate retention | Ratio | 0.98 | 1.00 | 0.75 | 0.88 |
| | | Rating | good | good | good | good |
| | Launch angle retention | Ratio | 1.01 | 1.01 | 1.16 | 1.08 |
| | | Rating | good | good | good | good |
| Sand wedge evaluation (HS, 10 m/s) | DRY | Initial velocity (m/s) | 9 | 9 | 9 | 9 |
| | | Launch angle (deg) | 34.9 | 34.8 | 34.9 | 34.9 |
| | | Spin rate (rpm) | 3,545 | 3,645 | 3,595 | 3,595 |
| | WET | Initial velocity (m/s) | 9 | 9 | 9 | 9 |
| | | Launch angle (deg) | 39.4 | 37.6 | 40.5 | 38.5 |
| | | Spin rate (rpm) | 2,759 | 3,121 | 2,600 | 2,940 |
| | Spin rate retention | Ratio | 0.78 | 0.86 | 0.72 | 0.82 |
| | | Rating | good | good | good | good |
| | Launch angle retention | Ratio | 1.13 | 1.08 | 1.16 | 1.11 |
| | | Rating | good | good | good | good |

TABLE 4-continued

|  |  |  | Comparative Example | | |
|---|---|---|---|---|---|
|  |  |  | 1 | 2 | 3 |
| Ball layers | Coating layer | | IV | IV | V |
|  | Outermost layer | | No. 4 | No. 3 | No. 5 |
|  | Intermediate layer | | No. 1 | No. 2 | No. 2 |
|  | Core | | A | B | A |
| Sand wedge evaluation (HS, 20 m/s) | DRY | Initial velocity (m/s) | 17 | 17 | 17 |
|  |  | Launch angle (deg) | 32.7 | 33.0 | 33.0 |
|  |  | Spin rate (rpm) | 6,598 | 6,614 | 6,416 |
|  | WET | Initial velocity (m/s) | 17 | 17 | 17 |
|  |  | Launch angle (deg) | 40.0 | 42.6 | 40.8 |
|  |  | Spin rate (rpm) | 4,288 | 3,452 | 3,975 |
|  | Spin rate retention | Ratio | 0.65 | 0.52 | 0.62 |
|  |  | Rating | NG | NG | NG |
|  | Launch angle retention | Ratio | 1.22 | 1.29 | 1.24 |
|  |  | Rating | NG | NG | NG |
| Sand wedge evaluation (HS, 10 m/s) | DRY | Initial velocity (m/s) | 9 | 9 | 9 |
|  |  | Launch angle (deg) | 35.0 | 34.7 | 35.3 |
|  |  | Spin rate (rpm) | 3,557 | 3,636 | 3,454 |
|  | WET | Initial velocity (m/s) | 8 | 9 | 8 |
|  |  | Launch angle (deg) | 45.4 | 44.7 | 43.6 |
|  |  | Spin rate (rpm) | 1,728 | 1,888 | 2,004 |
|  | Spin rate retention | Ratio | 0.49 | 0.52 | 0.58 |
|  |  | Rating | NG | NG | NG |
|  | Launch angle retention | Ratio | 1.30 | 1.29 | 1.24 |
|  |  | Rating | NG | NG | NG |

|  |  |  | Comparative Example | | |
|---|---|---|---|---|---|
|  |  |  | 4 | 5 | 6 |
| Ball layers | Coating layer | | — | — | — |
|  | Outermost layer | | — | — | — |
|  | Intermediate layer | | — | — | — |
|  | Core | | — | — | — |
| Sand wedge evaluation (HS, 20 m/s) | DRY | Initial velocity (m/s) | 17 | 17 | 17 |
|  |  | Launch angle (deg) | 33.1 | 32.9 | 32.7 |
|  |  | Spin rate (rpm) | 6,464 | 6,500 | 6,562 |
|  | WET | Initial velocity (m/s) | 17 | 17 | 17 |
|  |  | Launch angle (deg) | 39.7 | 41.9 | 41.9 |
|  |  | Spin rate (rpm) | 4,371 | 3,664 | 3,565 |
|  | Spin rate retention | Ratio | 0.68 | 0.56 | 0.54 |
|  |  | Rating | NG | NG | NG |
|  | Launch angle retention | Ratio | 1.20 | 1.27 | 1.28 |
|  |  | Rating | NG | NG | NG |
| Sand wedge evaluation (HS, 10 m/s) | DRY | Initial velocity (m/s) | 9 | 9 | 9 |
|  |  | Launch angle (deg) | 35.1 | 35.1 | 34.8 |
|  |  | Spin rate (rpm) | 3.517 | 3.532 | 3.579 |
|  | WET | Initial velocity (m/s) | 9 | 9 | 9 |
|  |  | Launch angle (deg) | 41.8 | 43.7 | 42.2 |
|  |  | Spin rate (rpm) | 2,322 | 2,029 | 2,252 |
|  | Spin rate retention | Ratio | 0.66 | 0.57 | 0.63 |
|  |  | Rating | NG | NG | NG |
|  | Launch angle retention | Ratio | 1.19 | 1.25 | 1.21 |
|  |  | Rating | good | NG | NG |

As is apparent from the results in Table 4, the golf balls in Examples 1 to 4 according to the present invention satisfy both of the conditions "Spin W/Spin D≥0.70" and "Ang W/Ang D<1.20" at head speeds of both 20 m % s and 10 m/s. As a result, these golf balls has a good controllability under wet conditions. By contrast, the golf balls in Comparative Examples 1 to 6 failed to satisfy both of the conditions "Spin W/Spin D≥0.70" and "Ang W/Ang D<1.20" at these head speeds. As a result, they had a poor controllability under wet conditions.

Japanese Patent Application No. 2019-231164 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core and a cover, wherein the ball has a spin rate and a launch angle on approach shots at a head speed (HS) of 20 m/s that satisfy formulas (1) and (2) below:

$$\text{Spin } W/\text{Spin } D \geq 0.70 \tag{1}$$

$$Ang\ W/Ang\ D < 1.20 \tag{2},$$

where Spin D is the spin rate (rpm) under dry conditions, Spin W is the spin rate (rpm) under wet conditions, Ang W is the launch angle (°) under wet conditions and Ang D is the launch angle (°) under dry conditions, and wherein the cover has an outermost layer on which a coating layer is formed, which coating layer is formed of a coating composition consisting of a urethane coating containing both a base resin comprising a polyester polyol, an acrylic additive and a solvent, and a curing agent comprising a polyisocyanate.

2. The golf ball of claim 1, wherein the acrylic additive comprises a silicone-modified acrylate.

3. The golf ball of claim 1, wherein hexamethylene diisocyanate is used as the polyisocyanate, with both an isocyanurate and an adduct of the hexamethylene diisocyanate being used together.

4. The golf ball of claim 3, wherein the mixing ratio of the isocyanurate and the adduct of hexamethylene diisocyanate, expressed as the weight ratio "isocyanurate/adduct," is from 95/5 to 40/60.

5. The golf ball of claim 1, wherein the amount of the acrylic additive is from 0.1 to 10 parts by weight per 100 parts by weight of the base resin, inclusive of a solvent.

6. A golf ball comprising a core and a cover, wherein the ball has a spin rate and a launch angle on approach shots at a head speed (HS) of 10 m/s that satisfy formulas (1) and (2) below:

$$\text{Spin } W/\text{Spin } D \geq 0.70 \quad (1)$$

$$\text{Ang } W/\text{Ang } D < 1.20 \quad (2),$$

where Spin D is the spin rate (rpm) under dry conditions, Spin W is the spin rate (rpm) under wet conditions, Ang W is the launch angle (°) under wet conditions and Ang D is the launch angle (°) under dry conditions, and wherein the cover has an outermost layer on which a coating layer is formed, which coating layer is formed of a coating composition consisting of a urethane coating containing both a base resin comprising a polyester polyol, an acrylic additive and a solvent, and a curing agent comprising a polyisocyanate.

7. The golf ball of claim 6, wherein the amount of the acrylic additive is from 0.1 to 10 parts by weight per 100 parts by weight of the base resin, inclusive of a solvent.

8. The golf ball of claim 6, wherein the acrylic additive comprises a silicone-modified acrylate.

9. The golf ball of claim 6, wherein hexamethylene diisocyanate is used as the polyisocyanate, with both an isocyanurate and an adduct of the hexamethylene diisocyanate being used together.

10. The golf ball of claim 9, wherein the mixing ratio of the isocyanurate and the adduct of hexamethylene diisocyanate, expressed as the weight ratio "isocyanurate/adduct," is from 95/5 to 40/60.

* * * * *